US010337108B2

(12) United States Patent
Joshi et al.

(10) Patent No.: US 10,337,108 B2
(45) Date of Patent: Jul. 2, 2019

(54) ELECTROCHEMICAL PRODUCTION OF HYDROGEN

(71) Applicant: FIELD UPGRADING LIMITED, Calgary (CA)

(72) Inventors: Ashok V Joshi, Salt Lake City, UT (US); Sai Bhavaraju, West Jordan, UT (US)

(73) Assignee: ENLIGHTEN INNOVATIONS INC., Calgary (CA)

( * ) Notice: Subject to any disclaimer, the term of this patent is extended or adjusted under 35 U.S.C. 154(b) by 253 days.

(21) Appl. No.: 15/061,427

(22) Filed: Mar. 4, 2016

(65) Prior Publication Data

US 2016/0222524 A1 Aug. 4, 2016

Related U.S. Application Data

(63) Continuation of application No. 13/349,269, filed on Jan. 12, 2012, now Pat. No. 9,297,084.
(Continued)

(51) Int. Cl.
*C25B 1/10* (2006.01)
*C25B 1/20* (2006.01)
(Continued)

(52) U.S. Cl.
CPC .............. *C25B 1/10* (2013.01); *C25B 1/04* (2013.01); *C25B 1/20* (2013.01); *C25B 1/24* (2013.01);
(Continued)

(58) Field of Classification Search
CPC .................................... C25B 1/24; C25B 1/04
See application file for complete search history.

(56) References Cited

U.S. PATENT DOCUMENTS

| 3,726,937 A | 4/1973 | Stepanov et al. |
| 4,191,618 A | 3/1980 | Coker et al. |
| (Continued) | | |

FOREIGN PATENT DOCUMENTS

| JP | 48066592 | 9/1973 |
| JP | 61009241 | 3/1986 |
| (Continued) | | |

OTHER PUBLICATIONS

Kokai, , "English Abstract", JP Patent 01184293, Jul. 21, 1989, 1-4.
(Continued)

*Primary Examiner* — Brian W Cohen
(74) *Attorney, Agent, or Firm* — Foley & Lardner LLP

(57) ABSTRACT

Electrochemical systems and methods for producing hydrogen. Generally, the systems and methods involve providing an electrochemical cell that includes an anolyte compartment holding an anode in contact with an anolyte, wherein the anolyte includes an oxidizable substance having a higher standard oxidation potential than water. The cell further comprises a catholyte compartment holding a cathode in contact with a catholyte that includes a substance that reduces to form hydrogen. Additionally, the cell includes an alkali cation conductive membrane that separates the anolyte compartment from the catholyte compartment. As an electrical potential passes between the anode and cathode, the reducible substance reduces to form hydrogen and the oxidizable substance oxidizes to form an oxidized product. The pH within the catholyte compartment may be controlled and maintained to a value in the range of 6 to 8. Apparatus and methods to regenerate the oxidizable substance are disclosed.

17 Claims, 8 Drawing Sheets

Related U.S. Application Data

(60) Provisional application No. 61/432,117, filed on Jan. 12, 2011.

(51) Int. Cl.
*C25B 1/24* (2006.01)
*C25B 15/08* (2006.01)
*C25B 9/08* (2006.01)
*C25B 1/04* (2006.01)
*C25B 9/10* (2006.01)
*C25B 13/04* (2006.01)

(52) U.S. Cl.
CPC .................. *C25B 9/08* (2013.01); *C25B 9/10* (2013.01); *C25B 13/04* (2013.01); *C25B 15/08* (2013.01); *Y02E 60/366* (2013.01); *Y02P 20/134* (2015.11)

(56) References Cited

U.S. PATENT DOCUMENTS

| | | | |
|---|---|---|---|
| 4,239,607 | A | 12/1980 | Maget |
| 4,466,869 | A | 8/1984 | Ayers |
| 4,488,945 | A | 12/1984 | Spaziante |
| 4,956,061 | A | 9/1990 | Dempsey et al. |
| 5,391,267 | A * | 2/1995 | Zoppi ..................... C01B 17/22 205/510 |
| 5,520,793 | A | 5/1996 | Genders et al. |
| 5,578,189 | A | 11/1996 | Joshi |
| 5,593,552 | A * | 1/1997 | Joshi ......................... B01J 7/00 204/230.5 |
| 5,624,545 | A * | 4/1997 | Landfors ............ D21C 11/0042 205/494 |
| 6,183,623 | B1 | 2/2001 | Cisar et al. |
| 6,638,413 | B1 | 10/2003 | Weinberg et al. |
| 6,719,891 | B2 | 4/2004 | Ruhr et al. |
| 6,936,143 | B1 | 8/2005 | Graetzel et al. |
| 7,122,873 | B2 | 10/2006 | Miller et al. |
| 2002/0179456 | A1 | 12/2002 | Yamashita et al. |
| 2005/0177008 | A1 | 8/2005 | Balagopal et al. |
| 2007/0138020 | A1 | 6/2007 | Balagopal et al. |
| 2008/0131762 | A1 | 6/2008 | Joo |
| 2008/0173540 | A1 | 7/2008 | Joshi et al. |
| 2010/0044241 | A1 | 2/2010 | Pendleton et al. |
| 2010/0089762 | A1 | 4/2010 | Gordon |
| 2010/0133111 | A1 | 6/2010 | Nocera et al. |
| 2012/0175268 | A1 | 7/2012 | Joshi et al. |
| 2012/0273365 | A1 | 11/2012 | Joshi |
| 2015/0322580 | A1 | 11/2015 | Little |
| 2016/0222524 | A1 | 8/2016 | Joshi |

FOREIGN PATENT DOCUMENTS

| | | |
|---|---|---|
| JP | 01184293 | 7/1989 |
| WO | WO9500701 | 1/1995 |
| WO | WO-2012/097167 A2 | 7/2012 |

OTHER PUBLICATIONS

Kokai, , "English Translation of Claims", JP48066592, Sep. 12, 1976, 1-6.
Kokoku, , "English Abstract", JP Patent 61-009241, Mar. 20, 1986, 1.
Kosminsky, et al., "Studies on the catalytic reduction of iodate at glassy carbon electrodes modified by molybdenum oxides", Journal of Electroanalytical Chemistry 471 (1999), Feb. 3, 1999, 37-41.
Lee, Jong K. , "International Search Report", PCT/US2012/021099 (Corresponding to U.S. Appl. No. 13/349,269), dated Aug. 30, 2012, 1-4.
Lee, Jong K. , "Written Opinion of the International Searching Authority", PCT/US2012/021099 (Corresponding to U.S. Appl. No. 13/349,269), dated Aug. 30, 2012, 1-3.
Yamamoto, Yuichi , "English Translation of Non Final Office Action", Japanese Patent Application No. 2013-549545, dated Jan. 5, 2016, 1-12.
Yamamoto, Yuichi , "Non Final Office Action", Japanese Patent Application No. 2013-549545, Jan. 5, 2016, 1-8.
Unknown, , "Notice of Allowance", Japanese Patent Application No. 2013-549545, dated Feb. 7, 2017, 1-4.
Examiner's Report in CA Application No. 2860419 dated Jan. 30, 2018 (3 pages).
Examiner's Report in CA Application No. 2860419 dated May 4, 2017 (4 pages).
Final Rejection Office Action in U.S. Appl. No. 13/349,269 dated Feb. 10, 2015 (16 pages).
International Search Report and Written Opinion in International Application No. PCT/US2016/062957 dated Mar. 6, 2017 (11 pages).
International Search Report and Written Opinion in International Application No. PCT/US2017/020349 dated May 11, 2017 (13 pages).
Non-Final Rejection Office Action in U.S. Appl. No. 13/349,269 dated Jun. 22, 2015 (19 pages).
Non-Final Rejection Office Action in U.S. Appl. No. 13/349,269 dated Aug. 4, 2014 (13 pages).
Rajaambal, et al., "Recent developments in solar H2 generation from water splitting," Journal of Chemical Sciences, Jan. 2015, pp. 33-47, vol. 127, Issue 1.
Non-Final Office Action on U.S. Appl. No. 15/356,235 dated Nov. 30, 2018.

* cited by examiner

ELECTROCHEMICAL PRODUCTION OF HYDROGEN

CROSS-REFERENCE TO RELATED APPLICATION

This application is a continuation-in-part of U.S. patent application Ser. No. 13/349,269 filed Jan. 12, 2012, which '269 application claims priority to, and the benefit of, U.S. Provisional Application No. 61/432,117, filed Jan. 12, 2011, entitled "Electrochemical Production of Hydrogen." The referenced patent applications are hereby incorporated by reference.

FIELD OF THE INVENTION

The present invention relates in general to the electrochemical production of hydrogen. More particularly, the present invention provides systems and methods for producing hydrogen through the use of an electrochemical cell in which the anolyte comprises an oxidizable substance that has a higher standard oxidation potential than water.

BACKGROUND OF THE INVENTION

Hydrogen gas is used in a variety of industrial applications. For instance, hydrogen is often used in the creation of ammonia for fertilizer, for the conversion of heavy petroleum sources to lighter fractions through a process called hydrocracking, for the production of nickel-hydrogen batteries, and for several other applications. Hydrogen is a clean burning fuel and a source of energy for fuel cells.

In order to obtain hydrogen for use in such applications, hydrogen can be produced through an assortment of techniques, including through the electrolysis of water, the reaction of a metal with an acid, the steam reformation of natural gas, the partial oxidation of hydrocarbons, and through several other methods.

Indeed, in some instances, hydrogen gas is formed through the electrolysis of water. In such instances, water or an alkaline water solution, is placed in an electrolytic cell comprising an anode and a cathode. Then as an electrical current is passed between the anode and cathode, hydrogen is produced at the cathode by reduction of water and oxygen is produced at the anode by water oxidation. For instance, the two electrode half reactions for traditional alkaline water electrolysis are:

$$2OH^- \rightarrow H_2O + \tfrac{1}{2}O_2 + 2e^- \quad \text{Anode:}$$

$$2H_2O + 2e^+ \rightarrow 2OH^- + H_2 \quad \text{Cathode:}$$

Moreover, the overall reaction of traditional alkaline water splitting is:

$$H_2O \rightarrow H_2 + \tfrac{1}{2}O_2 \quad \text{Overall:}$$

While the production of hydrogen gas through the electrolysis of water has been found to be a useful process, it is not without its shortcomings. For instance, the theoretical open cell voltage for the oxidation and reduction of traditional water electrolysis is about 1.23 volts ("V") and the operating voltage is typically ≥1.8V at practical current densities when the overvoltage is taken into account. As a result, the production of hydrogen through such traditional electrolytic methods may be relatively energy-intense, inefficient, and expensive. Therefore a lower voltage less energy intensive process will be attractive for production of hydrogen.

BRIEF SUMMARY OF THE INVENTION

The present invention provides systems and methods for producing hydrogen gas through the use of an electrochemical cell. While the cell can comprise any suitable components, in some non-limiting instances, the cell comprises an anolyte compartment that houses an anolyte and an anode, a catholyte compartment that houses a catholyte and a cathode, and an alkali cation selective membrane that is disposed between the catholyte compartment and the anolyte compartment. In such instances, the cell is configured to hold a hydrogen-containing reducible substance in the catholyte to produce hydrogen gas on the cathode and the anode and/or anolyte may comprise any suitable substance that oxidizes on the anode such that the cell has an open circuit cell voltage of less than about 1.23V and an operating voltage that is typically ≤1.8V at practical current densities when the cell produces hydrogen. As used herein throughout, references to the anode containing a suitable oxidizable substance are also applicable to the anolyte and vice versa. In some instances the term "anode/anolyte" is to mean the anode, the anolyte, or both.

It will be appreciated by those of skill in the art that 1.23V is the theoretical decomposition voltage of water. The oxidizable substance herein is selected to be easier to oxidize than water. A lower cell voltage than traditional water electrolysis is achieved by utilizing a suitable oxidizable substance having a higher standard oxidation potential than oxygen generation reaction from water (i.e. a substance that is easier to oxidize) as the anode reaction. Some examples of such oxidizable substances include, but are not limited to, an iodide ion, a sulfide ion, a manganese oxide ion, and an aluminum oxide ion. In one embodiment, the oxidizable substance may be in the form of an alkali metal salt of the oxidizable substance that is added to the anolyte. In another embodiment, the oxidizable substance may be in the form of the solid anode. Some examples of suitable alkali metal salts include, without limitation, an iodide, sulfide, manganese oxide, and aluminum oxide of each of the following: sodium, lithium, and potassium. In one embodiment, the oxidizable substance is a in a substantially solid form as is applied as a coating to a suitable current collector.

In addition to the oxidizable substance, the anode/anolyte may also comprise any other suitable material. For instance, the anolyte can comprise a non-aqueous solvent (including, without limitation, glycerol and/or anhydrous methanol), a second and different alkali metal salt, a solid-state conductive additive (e.g., graphite), an aqueous solution, an ionic liquid, and/or any other suitable material or a liquid conductive additive (e.g. Tetramethylammonium Tetrafluroborate or conductive metal particles).

The catholyte can comprise any suitable substance that allows the cell to reduce a reducible substance in the catholyte to form hydrogen and when combined with the aforementioned anolyte, allows the cell to have an open cell voltage (OCV) of less than about 1.23V and an operating voltage ≤1.8V at practical current densities during hydrogen production. Some examples of suitable substances that can be included in the catholyte include, but are not limited to, an alkali hydroxide or carbonate (e.g., sodium hydroxide or sodium carbonate) and/or a non-aqueous methanol/alkali methoxide solution (e.g., a non-aqueous methanol/sodium methoxide solution).

The anode/anolyte current collector may comprise any suitable material that allows the oxidizable substance in the anode/anolyte to oxidize when electrical current passes between the anode and the cathode. Some examples of suitable anode current collector materials include, but are not limited to, variety of stainless steels, metal alloys such as KOVAR, titanium, platinum, lead dioxide, carbon-based materials (e.g., boron-doped diamond, glassy carbon, synthetic carbon, carbides, graphite etc.), metal oxides such as Dimensionally Stable Anode and other known or novel anode materials. Additionally, in some embodiments in which the anolyte comprises an aqueous solution, the anode comprises a dimensionally stable anode, which may include, but is not limited to, rhenium dioxide and titanium dioxide on a titanium substrate, and ruthenium dioxide and tantalum pentoxide on a titanium substrate.

The cathode current collector can comprise any suitable material that allows electron transfer to the reducible substance in the catholyte to produce hydrogen gas. In this regard, some examples of suitable cathode current collector materials include, without limitation, nickel, stainless steel, graphite, a nickel-cobalt-ferrous alloy (e.g., a KOVAR® alloy), and any other suitable cathode material that is known or novel.

With respect to the alkali cation selective membrane, the membrane can comprise virtually any suitable alkali cation selective membrane. Some examples of such membranes include, but are not limited to, a NaSICON membrane, a NaSICON-type membrane, a LiSICON membrane, a LiSICON-type membrane, a KSICON membrane, a KSICON-type membrane, a sodium conducting glass, a β or β" alumina membrane, and a solid polymeric sodium ion conductive membrane.

While the cell can function in any suitable manner, in some non-limiting instances, as an electrical current passes between the anode and the cathode, the reducible substance in the catholyte (e.g., water or methanol) is reduced to evolve hydrogen and the oxidizable substance in the anode/anolyte is oxidized to produce an oxidized product. For instance, where the alkali metal salt of the oxidizable substance is selected from sodium iodide, sodium sulfide, sodium manganese oxide, or sodium aluminum oxide, the oxidizable substance can be oxidized to form triodide complex ion or molecular iodine, molecular sulfur, manganese oxide, and alumina, respectively. Additionally, as the electrical current passes between the electrodes, the alkali cations from the alkali metal salt of the oxidizable substance are driven through the alkali cation selective membrane to allow the cations to enter the catholyte compartment where the cations can react to form an alkali hydroxide, an alkali methoxide, and/or a variety of other substances.

After hydrogen has been formed in the catholyte compartment and the oxidizable substance in the anolyte (e.g., the iodide ion or sulfide ion) has been oxidized to form an oxidized product (e.g., molecular iodine/tri-iodide or sulfur), the oxidized product can be reacted with the alkali hydroxide from the catholyte compartment to regenerate the alkali metal salt of the oxidizable substance. For instance, where the oxidizable substance in the anolyte is obtained by adding sodium iodide to the anolyte, molecular iodine or triodide complex ion is formed from the oxidation of the iodide ion and sodium hydroxide can be formed in the catholyte compartment. In turn, the molecular iodine or triodide complex ion and the sodium hydroxide can be reacted together to regenerate sodium iodide, which can be recycled through the cell. This regeneration of oxidizable material ensures continuous production of hydrogen from water without the requirement to supply fresh oxidizable material.

Another embodiment of the disclosed invention controls the pH of the catholyte compartment to a pH within the range of about 6 to 8. It has been found that an operating pH near neutral in the catholyte compartment helps lower the overall cell voltage.

In some embodiments, the pH of the catholyte is maintained in the range of about 6 to 8 through the use of one or more buffer compounds. In one non-limiting embodiment, an alkali metal borate is added to the catholyte to lower and maintain the pH in a desired range.

While the described systems and methods have been found to be particularly useful for the production of hydrogen through the use of sodium iodide in the anolyte, the described methods (as stated above) may be modified to produce hydrogen through the use of one or more other oxidizable substances that has a higher standard oxidation potential than oxygen evolution reaction from water. For example, instead of using sodium iodide solution as the anolyte, the described systems and methods may use any other alkali salt of a suitable oxidizable substance. For instance, the described systems and methods may use potassium iodide, lithium iodide, and/or a sulfide anolyte solutions or solid anode made of sulfide/polysulfide, manganese oxide, or aluminum oxide of an alkali metal selected from sodium, potassium, and lithium.

Another embodiment of the disclosed invention regenerates the anolyte oxidizable substance. In the foregoing example discussing sodium iodide as the anolyte oxidizable substance, the sodium iodide can be regenerated in any suitable manner. In one embodiment, the sodium iodide is regenerated by reacting oxidized product (iodine or triodide) from the anolyte with sodium hydroxide from the catholyte (or some other suitable source such as sodium methoxide). Therefore, practically all of the sodium iodide (or other alkali metal salt) can be regenerated for use in the cell.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and processes of the described invention, all of the described embodiments and examples are to be considered, in all respects, as illustrative only and not as being limiting in any manner.

Furthermore, the described features, structures, characteristics, processes, or methods of the invention may be combined in any suitable manner in one or more embodiments. In the following description, numerous specific details are provided, such as examples of suitable anolytes, catholytes, alkali cation selective membranes, anode materials, cathode materials, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, processes, or operations are not shown or described in detail to avoid obscuring aspects of the invention.

The present invention provides systems and methods for producing hydrogen gas through the use of an electrochemical cell that has a cell open circuit voltage that is lower than the traditional open circuit voltage for water splitting ~1.23V and an operating voltage ≤1.8V at practical current densities. Accordingly, the hydrogen production begins when the voltage of the electrochemical cell is less than the theoretical decomposition of water. In order to do this, the current systems and methods replace the water oxidation reaction from traditional water electrolysis with a different anode reaction that has a higher standard oxidation potential than oxygen evolution from water. To provide a better understanding of the described systems and methods, the electrochemical cell is described below in more detail. This description of the cell is then followed by a more detailed description of the manner in which the cell can be operated.

Figure 1:
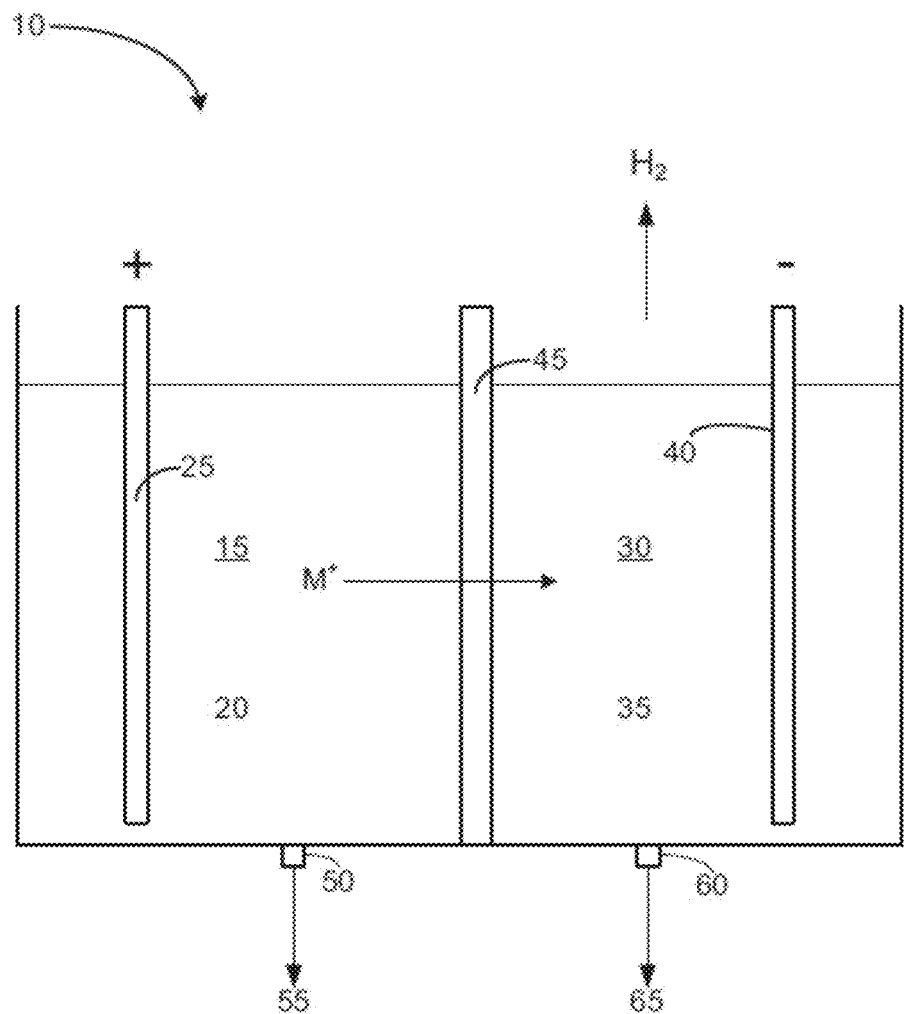
FIG. 1 depicts a schematic diagram of a representative embodiment of an electrochemical cell that is configured to produce hydrogen.

Turning now to the electrochemical cell, the cell can comprise any suitable anode that allows it to produce hydrogen gas at practical levels at an overall cell operating voltage that is less than about 1.8V. By way of non-limiting illustration, FIG. 1 shows a representative embodiment in which the electrochemical cell 10 comprises an anolyte compartment 15 that houses an anolyte 20 and an anode 25; a catholyte compartment 30 that houses a catholyte 35 and cathode 40; and an alkali cation selective membrane 45.

With respect to the anolyte compartment 15 and the catholyte compartment 30 in general, the two compartments can be any suitable shape and have any other suitable characteristic that allows the cell 10 to function as intended. By way of example, the anolyte and the catholyte compartments can be tubular, rectangular, or be any other suitable shape.

With regard to the cell 10, the specific anode and cathode reactions allow the cell 10 to have an open circuit voltage that is less than about the theoretical decomposition voltage of water, or 1.23V, when the cell 10 produces hydrogen. In this regard, the anolyte can comprise any suitable oxidizable substance that has a standard oxidation potential for the oxidation of the oxidizable substance that is higher than that of oxygen potential for the oxidation of water (i.e. easier to oxidize than water) and that allows the cell to function as intended. Said differently, the anolyte can comprise any suitable oxidizable substance that allows the open circuit cell voltage for the production of hydrogen from water to be less than a voltage selected from about 1.23V, about 1.1V, about 0.9V, and about 0.7V or less. Some examples of suitable oxidizable substances include, but are not limited to, an iodide ion, a sulfide ion, a manganese oxide ion, an aluminum oxide ion, and any other suitable oxidizable substance that has an oxidation potential that is higher than that of oxygen evolution from water.

The oxidizable substance in the anolyte 20 can be added to the anolyte in any suitable manner. For example, the oxidizable substance (e.g., the iodide ion, sulfide ion, etc.) can be added to anolyte through the addition of an alkali metal salt of the oxidizable substance. In this regard, some examples of suitable alkali metal salts of suitable oxidizable substances include, but are not limited to, sodium iodide, sodium sulfide, lithium iodide, lithium sulfide, potassium iodide, potassium sulfide, and/or any other suitable alkali metal salt of a suitable oxidizable substance. In some embodiments, however, the alkali metal salt comprises sodium iodide.

The oxidizable substance can also be a solid in which case it is the anode. For example, the solid oxidizable substance (e.g., the manganese oxide, aluminum oxide, etc.) can be made as thin film anode. In this regard, some examples of suitable alkali metal salts of suitable oxidizable substances include, but are not limited to, sodium sulfide/polysulfide, sodium manganese oxide, sodium aluminum oxide, lithium sulfide/polysulfide, lithium manganese oxide, lithium aluminum oxide, potassium sulfide/polysulfide, potassium manganese oxide, potassium aluminum oxide, and/or any other suitable alkali metal salt of a suitable oxidizable substance. In some embodiments, however, the alkali metal salt comprises sodium sulfide/polysulfide.

As the cell 10 functions, the alkali metal salt of the oxidizable substance can react in any suitable manner. In one example, when the alkali metal salt is added to anolyte, the salt can be ionized. In another example, when an electrical current is passed between the anode 25 and the cathode 40, the oxidizable substance of the alkali iodide, alkali sulfide, alkali manganese oxide, an alkali aluminum oxide, and/or another suitable alkali metal salt in the anode/anolyte can respectively be oxidized to form molecular iodine/triiodide, molecular sulfur, manganese oxide, alumina, and/or another oxidized product in the anolyte. Similarly, as the electrical current passes between the electrodes, the alkali cation (e.g., $Na^+$, $Li^+$, and $K^+$) released from the alkali metal salt can be selectively conducted through the alkali cation selective membrane 45 (described below) to the catholyte compartment 30, where the cation can react to form an alkali hydroxide, alkali methoxide and gaseous hydrogen product.

In addition to the alkali metal salt of the oxidizable substance, the anolyte 20 can comprise any other suitable component that allows the oxidizable substance to be oxidized at the anode 25 and that allows the open circuit voltage of the cell 10 to be less than about 1.23V during hydrogen production at the cathode. For instance, the anolyte can also comprise any suitable: non-aqueous solvent (including, without limitation, glycerol, anhydrous methanol, and/or another suitable non-aqueous solvent), ionic liquid, and/or aqueous solvent, solid-state conductive additive (including, without limitation, graphite, metal particles and/or another suitable conductive additive), complexing agent (tetramethylammonium tetrafluroborate or tetrabutyl ammonium iodide). In this regard, however, the additional additives to the anolyte should not cause the preferential oxidation of another substance over the oxidation of the oxidizable substance. In some embodiments, the additional additives to the anolyte do chemically react with the oxidized substance (e.g. complexation of tetrabutyl ammonium iodide with molecular iodine to form tetrabutyl ammonium triiodide).

Some non-limiting examples of suitable anolytes 20 are as follows. Specifically, in some embodiments, the anolyte 20 comprises an alkali metal salt as an oxidizable substance that is mixed with a conductive additive (e.g., graphite) and a liquid additive/solvent, such as glycerol, to form a semi-solid paste. By way of example, in some embodiments, the anolyte comprises sodium iodide or sodium sulfide, graphite, and a small amount of glycerol. In other embodiments, the anolyte comprises a non-oxidizable alkali metal salt (e.g., sodium tetrafluroborate or sodium hexafluorophosphate) that is dissolved in a suitable solvent (e.g., methanol, water, and/or an ionic liquid). For example, in some embodiments, the anolyte comprises oxidizable sodium iodide or sodium sulfide that is dissolved in a suitable solvent (e.g., methanol, water, and/or an ionic liquid). Along these lines, in still another example, the anolyte comprises sodium iodide or sodium sulfide in water.

With regard now to the catholyte 35, the catholyte can comprise any suitable substance that allows the cell 10 to reduce a reducible substance, such as water and/or methanol, in the catholyte to form hydrogen and allows the cell to have an open circuit voltage that is less than a voltage selected from about 1.23V, about 1.1V, about 0.9V, and about 0.7V or less and an operating voltage ≤1.8V at practical currents when the cell produces hydrogen.

Some examples of suitable catholytes include, but are not limited to, an aqueous alkali hydroxide solution (e.g., an aqueous solution comprising sodium hydroxide, lithium hydroxide, and/or potassium hydroxide, an aqueous solution comprising sodium carbonate, lithium carbonate, and/or potassium carbonate, an aqueous solution comprising acetic acid, halogen and mixtures thereof) and a non-aqueous methanol/alkali methoxide solution, wherein the alkali methoxide is selected from sodium methoxide, lithium methoxide, and potassium methoxide. Indeed, in some embodiments, the catholyte comprises an aqueous sodium hydroxide solution or a non-aqueous methanol/sodium methoxide solution.

Referring now to the anode 25, the anode and/or anode current collector can comprise any suitable characteristic or material that allows the cell 10 to oxidize the oxidizable substance in the anolyte 20 and to otherwise function as intended. By way of example, the anode and/or anode current collector can have any suitable characteristic, including, without limitation, being: a flat plate, a flat membrane, a mesh, a tubular shape, and/or a tubular mesh.

Some examples of suitable anode and/or anode current collector materials include, but are not limited to, stainless steel, titanium, lead dioxide, carbon-based materials (e.g., boron-doped diamond, glassy carbon, synthetic carbon, etc.), platinized titanium, ruthenium (IV) dioxide (RuO$_2$), dimensionally stable anode materials, and/or any other suitable anode material. Indeed, in some embodiments, the anode and/or anode current collector comprises a stainless steel mesh.

In some embodiments in which the anolyte 20 comprises an aqueous solution, the anode 25 comprises a dimensionally stable anode, which may include, but is not limited to, a rhenium dioxide and titanium dioxide on a titanium substrate, and a rhenium dioxide and tantalum pentoxide on a titanium substrate. In such embodiments, the dimensionally stable anode may help the cell 10 to preferentially oxidize the oxidizable substance (e.g., the iodide ion, the sulfide ion, etc.) over some other chemicals in the anolyte.

With respect to the cathode 40, the cathode can comprise any suitable characteristic or material that allows the cell 10 to reduce the reducible substance (e.g., water and/or methanol) to produce hydrogen and to otherwise allow the cell to function as intended. By way of example, the cathode can have any suitable characteristic, including, without limitation, being: a flat plate, a flat membrane, a mesh, a tubular shape, and/or a tubular mesh. Additionally, some examples of suitable cathode materials include, but are not limited to, nickel, stainless steel, graphite, a nickel-cobalt-ferrous alloy (e.g., a KOVAR® alloy), and/or any other suitable cathode material. Indeed, in some embodiments, the cathode comprises a nickel mesh cathode.

As electrical potential is passed between the anode 25 and cathode 40, any suitable reaction that allows the cell 10 to produce hydrogen can occur at the cathode 40. Some examples of suitable anodic reactions when the alkali metal of the oxidizable alkali metal salt is sodium include, but are not limited to, the following:

$$NaI \rightarrow \tfrac{1}{2}I_2 + Na^+ + e^- \qquad (A)$$

(when the anolyte 20 comprises sodium iodide)

$$3NaI \rightarrow \tfrac{1}{3}I_3^- + Na^+ + 2e^- \qquad (B)$$

(when the anolyte 20 comprises sodium iodide)

$$2Na_2S_2 \rightarrow Na_2S_4 + 2Na^+ + 2e^- \qquad (C)$$

(when the anolyte 20 or anode 25 comprises sodium polysulfide, where Na$_2$S$_2$ represents lower sodium poylsulfide and Na$_2$S$_4$ the higher sodium poylsulfide)

$$Na_xMnO_2 \rightarrow Na_yMnO_2 + (x-y)Na^+ + (x-y)e^- \qquad (D)$$

(when the anode 25 comprises sodium manganese oxide, where y>x)

Some examples of suitable cathodic reactions when the alkali metal of the oxidizable alkali metal salt is sodium include, but are not limited to, the following:

$$H_2O + 2e^- \rightarrow 2OH^- + H_2 \qquad (E)$$

(where the catholyte comprises water)

$$2Na^+ + 2H_2O + 2e^- \rightarrow 2NaOH + H_2 \qquad (F)$$

(where the catholyte comprises an aqueous solution and Na$^+$ cations are transported from the anolyte 20, through the membrane 45, and to the catholyte 35)

$$2Na^+ + 2CH_3OH + 2e^- \rightarrow 2MOCH_3 + H_2 \qquad (G)$$

(where the catholyte comprises methanol and Na⁺ cations are transported from the anolyte 20, through the membrane 45, and into the catholyte 35)

Thus, in some embodiments when the catholyte 35 comprises sodium hydroxide or sodium carbonate solution then at the end of the electrolysis of water more sodium hydroxide will form in the catholyte compartment 30 along with gaseous hydrogen. Similarly, in some embodiments where the alkali metal salt in the catholyte 35 comprises a lithium methylate and methanol, more lithium methoxide along with gaseous hydrogen will be formed in the catholyte compartment 30 as the cell 10 functions.

Moving now to the alkali cation selective membrane 45, the membrane can comprise virtually any suitable cation selective membrane that is configured to selectively transport an alkali cation (e.g., Na⁺, Li⁺, or K⁺) from the anolyte compartment 15 to the catholyte compartment 30 under the influence of an electrical potential. In this manner, the membrane can prevent the anolyte and catholyte from mixing, while still allowing alkali cations (shown as M⁺ in FIG. 1) to migrate to the catholyte compartment 30. Accordingly, in some embodiments, the membrane allows the cell 10 to comprise a non-aqueous anolyte and an aqueous catholyte, and vice versa.

Some examples of such membranes include, but are not limited to, a NaSICON membrane, a NaSICON-type membrane (e.g., a NaSICON-type membrane as produced by Ceramatec, Inc., Salt Lake City, Utah), a LiSICON membrane, a LiSICON-type membrane, a KSICON membrane, a KSICON-type membrane, a sodium conducting glass, a β or β″ alumina membrane, a solid polymeric sodium ion conductive membrane e.g. Nafion®, and any other suitable cation conductive membrane.

In addition to the aforementioned components and characteristics, the described cell 10 can comprise any other suitable component or characteristic. In this regard, in some embodiments, the various compartments of the cell have one or more inlets and/or outlets to allow materials to be added to and/or to be removed from the cell. By way of non-limiting illustration, FIG. 1 shows an embodiment in which the anolyte compartment 15 comprises an outlet 50 for removing oxidized products 55 (e.g., I₂ or I₃⁻, S, etc.) from the anolyte compartment, and the catholyte compartment 30 comprises an outlet 60 for removing chemicals 65, including without limitation, an alkali hydroxide and/or an alkali methoxide, from the catholyte chamber (depending on whether the catholyte 35 originally comprised water and/or methanol) and hydrogen gas.

In some embodiments, the cell 10 also comprises a power source (not shown). In such embodiments, the power source can comprise any suitable electrolytic cell power source. Furthermore, the power source can provide the cell with any suitable current density. Indeed, in some embodiments, the power source provides the cell with a current density as low as a current density selected from about 0.5 mA/cm², about 1 mA/cm², about 2.5 mA/cm², and about 5 mA/cm². Additionally, in some embodiments, the power source provides the cell with a current density that is as high as a current density selected from about 15 mA/cm², about 30 mA/cm², about 50 mA/cm², about 100 mA/cm², and about 250 mA/cm².

In some embodiments, the cell 10 optionally comprises a heating mechanism that is configured to heat the anolyte 20 and/or catholyte 35 as the cell functions. Indeed, while the cell can function at any suitable temperature at or above ambient, in some embodiments, the anolyte and/or catholyte are heated to a temperature that is above a temperature selected from about 40 degrees Celsius, about 60 degrees Celsius, about 80 degrees Celsius, and about 90 degrees Celsius. Moreover, in such embodiments, the anolyte and/or catholyte are kept cooler than a temperature that is selected from about 140 degrees Celsius, about 130 degrees Celsius, about 120 degrees Celsius, and about 100 degrees Celsius.

Turning now to the manner in which the cell 10 functions, the cell may function in any suitable manner apt for an electrolysis cell. To provide a better understanding of the manner in which the cell may function, FIGS. 2A and 2B respectively show a representative embodiment of a flow chart and a schematic diagram depicting an embodiment of a method 100 in which the cell may produce hydrogen. In this regard, it should be noted that the systems and methods shown in FIGS. 2A and 2B can be rearranged, added to, shortened, and/or otherwise changed in any suitable manner.

Figure 2A:
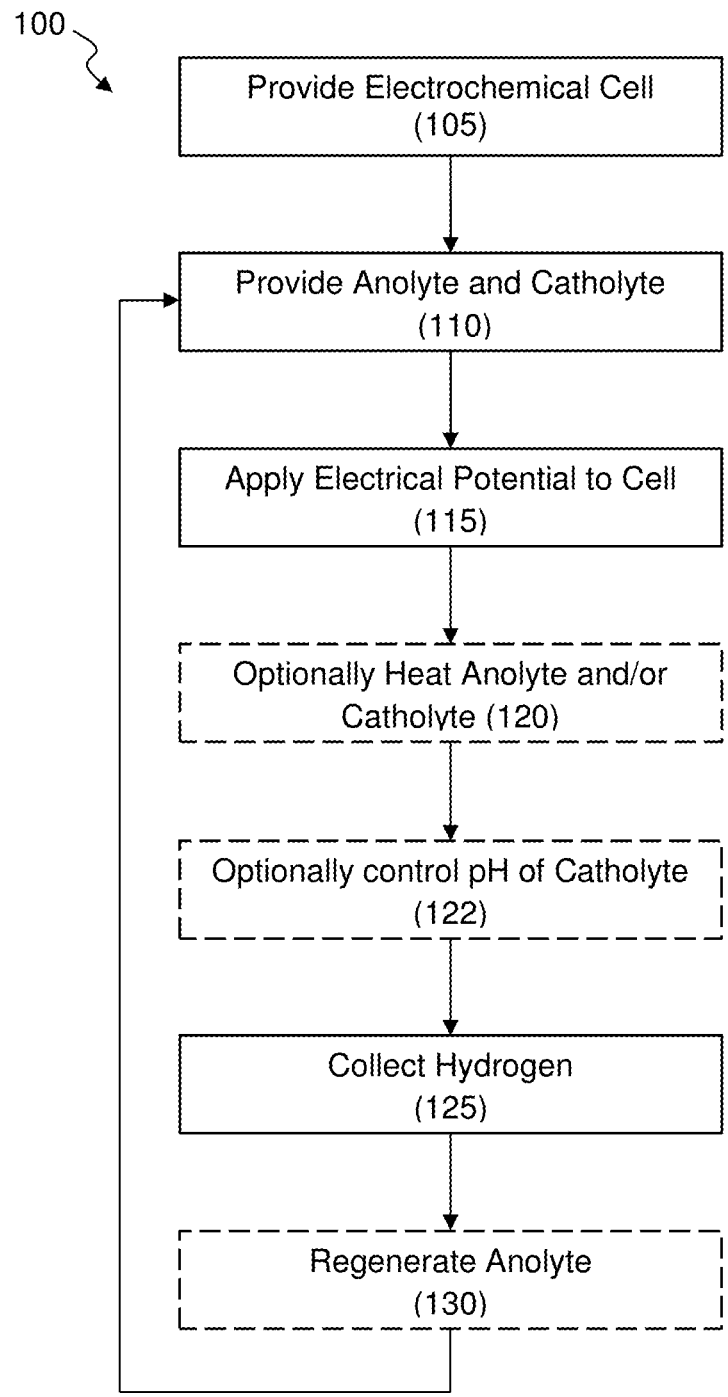
FIG. 2A depicts a flow chart showing a representative embodiment of a method for using the electrochemical cell.

At step 105, FIG. 2A shows that a representative embodiment of the described method 100 begins by providing the electrochemical cell 10 (as discussed above). Next, step 110 shows that the method continues as the anolyte 20 and catholyte 35 are added to the cell. While the skilled artisan will recognize that the described systems and methods can be implemented with any suitable anolyte and/or catholyte (as discussed above), for the sake of simplicity, the following discussion focuses on using the cell with an anolyte 20 comprising sodium iodide and a catholyte 35 comprising water (e.g., in the form of an aqueous solution of sodium hydroxide).

Moving on to step 115, FIG. 2A shows the method 100 continues as an electrical potential is applied between the anode 25 and the cathode 40. As this occurs, FIG. 2B shows that (i) the iodide ion (2I⁻) is oxidized at the anode 25 to form molecular iodine (I₂), (ii) the sodium cation (2Na⁺) is transported through the membrane 45, and (iii) water (H₂O) is reduced at the cathode 40 to form hydrogen gas (H₂) and hydroxide ions (OH⁻), which can react with the sodium cations to form sodium hydroxide (NaOH).

Figure 2B:
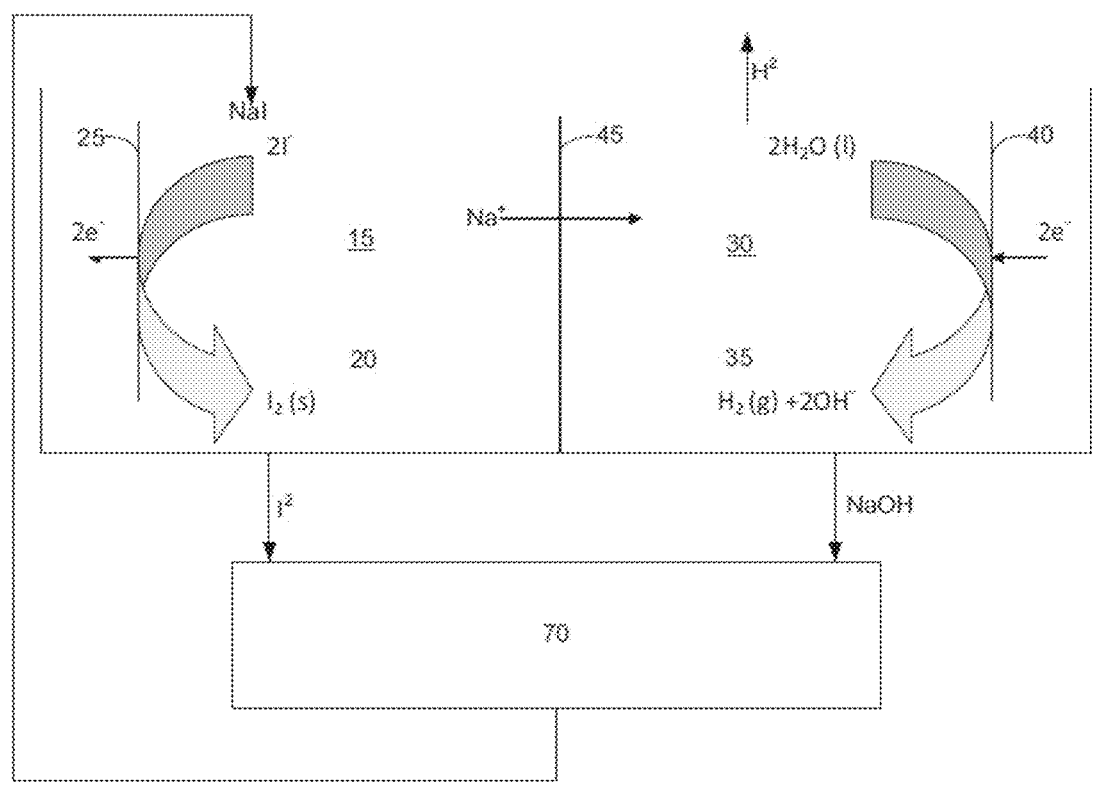
FIG. 2B depicts a schematic diagram of a representative embodiment of the electrochemical cell in which the cell comprises an anolyte that comprises sodium iodide, and a catholyte that comprises a sodium hydroxide solution.

Similarly, the following reactions A and E show that, in at least some embodiments, the calculated open cell voltage for the cell 10 illustrated in FIG. 2B is about 0.94V, which is smaller than the 1.23V over cell voltage for traditional water electrolysis.

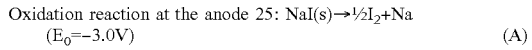

Oxidation reaction at the anode 25: NaI(s)→½I₂+Na ($E_0$=−3.0V)     (A)

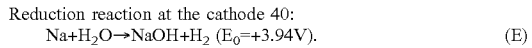

Reduction reaction at the cathode 40:
Na+H₂O→NaOH+H₂ ($E_0$=+3.94V).     (E)

In this regard, the open cell voltage for the overall reaction is calculated as $E_0$ red+$E_0$ oxd=+3.94−3.0=0.94V.

As the cell 10 functions, step 120 in FIG. 2A shows that the method 100 optionally includes heating the anolyte and/or the catholyte, as discussed above.

As the cell 10 functions, step 122 in FIG. 2A shows that the catholyte pH may be controlled. The pH of the catholyte in the catholyte compartment may be maintained at a near-neutral value. In some non-limiting embodiments, the catholyte pH is maintained at a value within the range of about 6 to 8. In some embodiments a buffer may be used to lower the pH of the catholyte in the catholyte compartment to a desired value.

Step 125 further shows that as the method 100 continues, hydrogen gas (H₂) is collected from the catholyte compartment 30 (also shown in FIG. 2B).

Next, step 130 shows that the method 100 can optionally continue as the oxidizable substance in the anolyte is regenerated. In the foregoing example discussing sodium iodide as the anolyte oxidizable substance, the sodium iodide can be regenerated in any suitable manner. Indeed, in some embodiments, the sodium iodide is regenerated by reacting iodine formed during oxidation formed in the anolyte 20 with sodium hydroxide formed in the catholyte 35 (or some other suitable source). Accordingly, most, if not substantially all, of the sodium iodide (or other alkali metal salt) can be regenerated for use in the cell 10.

Again, it should be noted that while the current disclosure includes a method for regenerating the oxidizable substance. Such a method may include the steps of recovering the oxidized product from the catholyte compartment, recovering the reduced product from the anolyte compartment, and reacting the oxidized product and the reduced product to regenerate the oxidizable substance. FIG. 2B includes a regeneration cell 70, comprising an inlet to receive the oxidized product from the anolyte compartment and the reduced product from the catholyte compartment. The regeneration cell is configured to cause a chemical reaction between the oxidized product and the reduced product to regenerate the oxidizable substance. In the case of the specific reactions depicted in FIG. 2B, the regeneration reaction includes reacting iodine with sodium hydroxide to regenerate sodium iodide. As depicted in FIG. 2B, the regenerated oxidizable substance can be introduced into the anolyte compartment 15.

The described methods can be used to regenerate any suitable alkali salt of an oxidizable substance by combining any suitable oxidized product (e.g., molecular iodine or triiodide, molecular sulfur or higher polysulfides, manganese oxide, alumina, etc.) produced in the anolyte compartment 15 with a suitable alkali hydroxide (e.g., sodium hydroxide, potassium hydroxide, or lithium hydroxide) that is produced in the catholyte compartment 30 (or which is obtained from any other suitable source).

With respect to the manner in which sodium iodide is regenerated, in some embodiments, the sodium iodide is regenerated by mixing the molecular iodine or triiodide with sodium hydroxide. When sodium hydroxide is reacted with molecular iodine, the reaction can proceed in a variety of manners. By way of example, reactions H and I (below) show that in some embodiments when sodium hydroxide is reacted with iodine, sodium iodate forms. Nevertheless, reaction J (below) shows that, in other embodiments, the formation of sodium iodate can be avoided.

$$2NaOH+I_2 \rightarrow NaI+NaOI+H_2O \qquad (H)$$

$$3NaOI \rightarrow NaIO_3+2NaI \qquad (I)$$

$$2NaOH+I_2 \rightarrow 2NaI+H_2O+\tfrac{1}{2}O_2 \qquad (J)$$

Because the formation of a sodium iodate intermediate product may be less favorable than simply producing sodium iodide without forming sodium iodate, in some embodiments, the process is configured to preferentially facilitate or reaction J over reactions H and/or I. In this regard, the conversion of sodium hydroxide and iodine directly into sodium iodide, water, and oxygen (e.g., reaction J) can be driven in any suitable manner, including, without limitation, by adding highly concentrated sodium hydroxide (or another alkali hydroxide) to the iodine (or to another oxidized product); by increasing the reaction temperature; by reacting the sodium hydroxide (or another alkali hydroxide) with the iodine (or another oxidized product) in the presence of a catalyst, ultraviolet light, and/or ultrasonic vibrations; and/or by any other suitable conditions.

Light, heat, organic matter, and certain heavy metals (such as copper, nickel, and cobalt) accelerate the rate of decomposition of sodium hypoiodite. The presence of transition metal ions (copper and nickel) is known to catalyze the decomposition of liquid sodium hypoiodite, contributing to the loss of sodium hypoiodite strength and the formation of oxygen. Also sodium hypoiodite decomposition is dependent on temperature. For any given strength, the higher the temperature, the faster it decomposes.

Where the regeneration of sodium iodide (or another alkyl metal salt) is facilitated by adding highly concentrated sodium hydroxide (or another alkyl hydroxide) to molecular iodine (or to another oxidized product) (e.g., through reaction J), the sodium hydroxide (or other alkyl hydroxide) can have any suitable concentration before it is added to the iodine (or other oxidized product). In some embodiments, the concentration of the sodium hydroxide (or other alkyl hydroxide) that is added to the molecular iodine (or other oxidized product) is as low as a concentration selected from about 15%, about 25%, about 30%, and about 35% by weight. In contrast, in some embodiments, the concentration of sodium hydroxide (or another alkyl hydroxide) that is added to the molecular iodine (or another oxidized product) is as high as a concentration selected from about 35%, about 40%, about 50%, and about 65%, by weight. Indeed, in some embodiments, the concentration of the sodium hydroxide is between about 30% and about 50%, by weight, before the sodium hydroxide is added to the molecular iodine.

Where the sodium hydroxide (or another alkyl hydroxide) is concentrated before being added to the molecular iodine (or another oxidized material), the sodium hydroxide can be concentrated in any suitable manner. In this regard, some examples of suitable methods for concentrating the sodium hydroxide (or other alkyl hydroxide) include, but are not limited to evaporating solvent (e.g., water) from the sodium hydroxide with heat obtained through solar energy, waste heat produced as an industrial byproduct, heat obtained through geothermal energy, Heat from joule heat generated during cell operation, and/or heat produced in any other suitable manner. Indeed, because heat obtained from solar energy, geothermal energy, and from industrial waste heat can be relatively inexpensive or substantially free. Such heat sources are also environmentally friendly. In some embodiments, the sodium hydroxide is concentrated through an evaporative process employing one or more such heat sources.

Where the regeneration of sodium iodide (or another alkali metal salt) is facilitated by heating the reaction (e.g., to drive reaction J), the reaction can be heated to any suitable temperature. The temperature should be below the boiling point of the reactants. Indeed, in some embodiments, the reaction is heated to a temperature that is as high as a temperature selected from about 110 degrees Celsius, about 120 degrees Celsius, about 130 degrees Celsius, and about 140 degrees Celsius. Additionally, when the reaction is heated, the reaction may be kept below a temperature as low as a temperature selected from about 100 degrees Celsius, about 90 degrees Celsius, about 70 degrees Celsius, and about 60 degrees Celsius. Indeed, in some embodiments, the reaction is heated to a temperature between about 70 and about 140 degrees Celsius.

Where the regeneration reaction is driven by heating the reaction, the reaction can be heated in any suitable manner. For instance, the reaction can be heated with heat obtained from solar energy, geothermal energy, industrial waste heat, and/or any other suitable heat source.

Where the regeneration reaction (e.g., reaction J) is driven by reacting the sodium hydroxide (or another alkali hydroxide) with iodine (or another oxidized product) in the presence of a catalyst, the catalyst can comprise any suitable catalyst, including, without limitation, a carbon catalyst and/or a metal-oxide catalyst. In this regard, one example of a suitable catalyst includes, but is not limited to, a catalyst comprising copper oxide (CuO) and manganese dioxide ($MnO_2$).

Where the regeneration of the alkali metal salt (e.g., reaction J) is facilitated by exposing the reaction to ultraviolet light, the reaction may be exposed to any suitable wavelength of ultraviolet light, from any suitable source, including, without limitation, the sun, an ultraviolet lamp, etc.

Where the regeneration of the alkali metal salt (e.g., reaction J) is facilitated by exposing the reaction to ultrasonic vibrations, the reaction can be exposed to ultrasonic vibrations having any suitable frequency and amplitude.

Sodium iodate is generated when reaction I happens instead of J. For instance, the following reactions L and M describe some possible manners in which such embodiments of this process may occur:

$$I_2 + 2OH^- \rightarrow I^- + OI^- + H_2O \quad (K)$$

$$3IO^- \rightarrow 2I^- + IO_3^- \quad (L)$$

Combining reactions K and L gives:

$$3I_2 + 6OH^- \rightarrow IO_3^- + 5I^- + 3H_2O \quad (M)$$

While the iodate ion ($IO_3^-$) can be converted to the iodide ion ($I^-$) in any suitable manner, in some embodiments, the conversion of the iodate ion is possible when the ion is reduced in acidic conditions in the presence of a glassy carbon electrode modified by molybdenum oxides as shown in the following reaction N:

$$IO_3^- + 6H^+ + 6e^- \rightleftharpoons I^- + 3H_2O \quad (N)$$

For a more detailed discussion concerning the conversion of the iodate ion to the iodide ion, see Luis Kosminsky, M. B. (1999), Studies on the catalytic reduction of iodate at glassy carbon electrodes by molybdenum oxides, Electroanalytical Chemistry, 37-41; the entire disclosure of which is hereby incorporated by reference.

Figure 3:
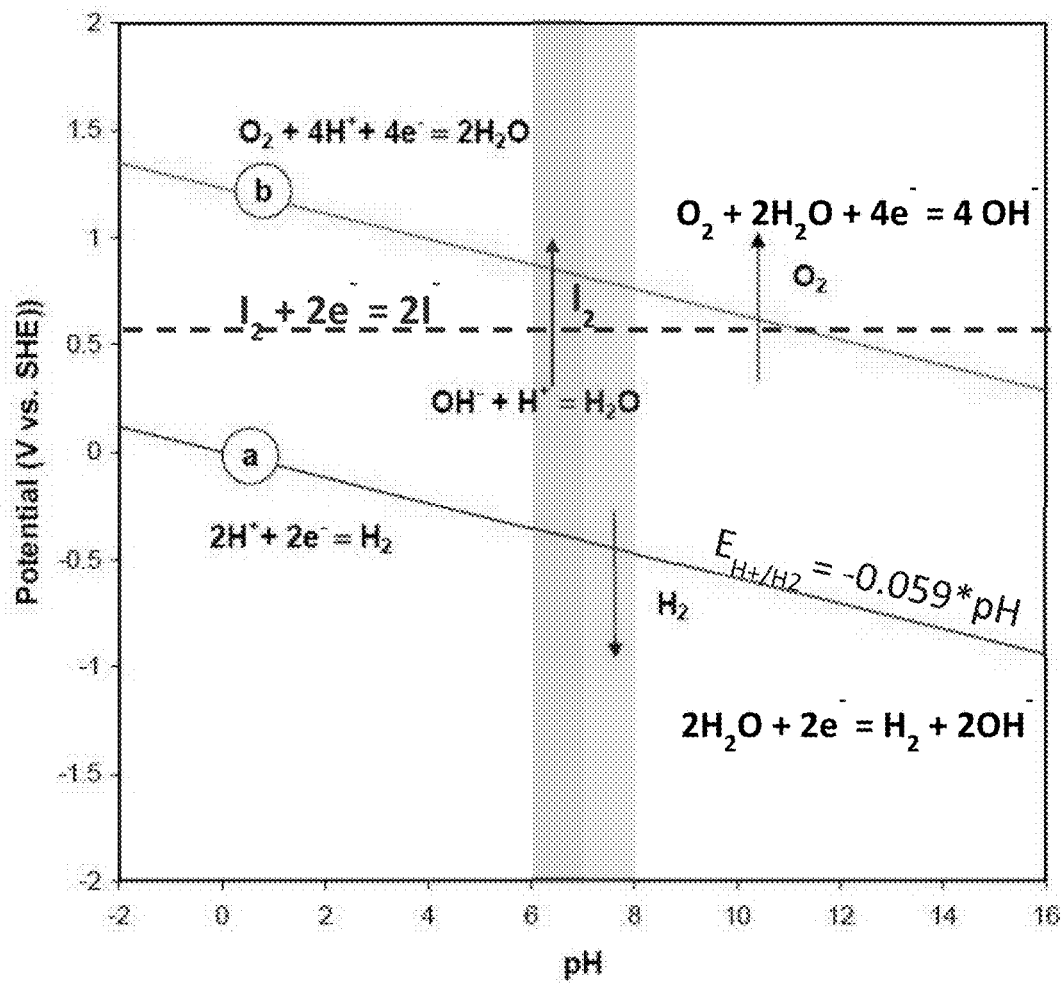
FIG. 3 is a pourbaix diagram of electric potential vs. pH for the catholyte and anolyte reactions.

Catholyte pH can affect the reaction potential of the reaction occurring in the catholyte compartment. FIG. 3 is a pourbaix diagram of potential vs. pH for the catholyte reduction reaction, reaction "a", which produces hydrogen and hydroxide ions, the anolyte oxidation reaction, which produces iodine, and the water oxidation reaction "b", which produces oxygen. From FIG. 3, the reaction potential for the two water dissociation reactions is affected by pH. In contrast, the reaction potential for the anolyte oxidation reaction which produces iodine is not affected by pH. Furthermore, when one compares the potential difference between the two water dissociation reactions, reactions "a" and "b", the potential difference is constant across the broad pH range. However, when one compares the potential difference between the water reduction reaction "a" and the iodide reduction reaction, it is apparent that the reaction potential decreases as the pH decreases. In other words, hydrogen can be electrochemically produced at increasingly lower operating voltage as the pH decreases.

In some embodiments the pH of the catholyte in the catholyte compartment is maintained at a near-neutral value. In some non-limiting embodiments, the catholyte pH is maintained at a value within the range of about 6 to 8. In some embodiments a buffer may be used to lower the pH of the catholyte in the catholyte compartment to a desired value. Although any suitable buffer may be used, in one non-limiting embodiment, a borax buffer (sodium borate) is added to the catholyte.

Figure 4:
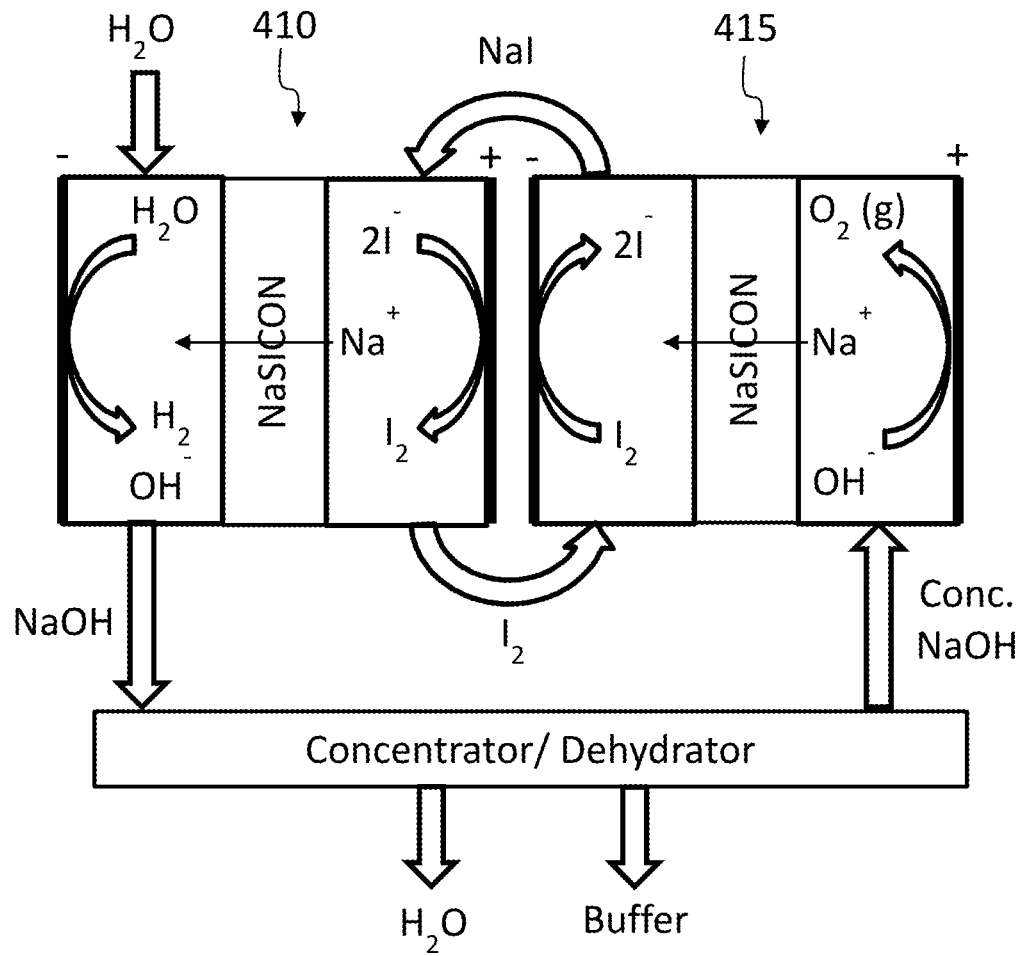
FIG. 4 depicts a schematic diagram of aa representative embodiment of an electrochemical cell that is configured to produce hydrogen and to a companion electrochemical cell that is configured to regenerate the oxidizable substance.

FIG. 4 illustrates another apparatus and method for the electrochemical production of hydrogen and for the regeneration of the anolyte. Two electrochemical cells 410, 415 are shown in FIG. 4. Electrochemical cell 410 is configured similar to the cells shown in FIGS. 1 and 2B in which an oxidizable substance in the anolyte is oxidized to form an oxidized product and a reducible substance in the catholyte is reduced to form hydrogen and a reduced product. While iodide is shown as the oxidizable substance and water is shown as the reducible substance, these substances are only illustrative and other oxidizable and reducible substances may be used as disclosed herein.

Electrochemical cell 415 operates to regenerate the oxidizable substance. This may be accomplished by introducing the oxidized product (iodine) into the catholyte compartment of cell 415. Catholyte solution containing the reduced product (hydroxyl ions in the form of NaOH) is withdrawn from the catholyte compartment of cell 410 and passed through a concentrator/dehydrator in which water is removed causing the sodium hydroxide concentration to be greatly increased. The concentrated sodium hydroxide solution is introduced into the anolyte compartment of electrochemical cell 415. The two electrode half reactions illustrated in cell 415 are:

$$2OH^- \rightarrow H_2O + \tfrac{1}{2}O_2 + 2e^- \quad \text{Anode:}$$

$$I_2 + 2Na^+ + 2e^- \rightarrow 2NaI \quad \text{Cathode:}$$

Moreover, the overall reaction of cell 415 is:

$$I_2 + 2NaOH \rightarrow H_2O + \tfrac{1}{2}O_2 + 2NaI \quad \text{Overall:}$$

From FIG. 3, the operating voltage of cell 415 is reduced as the anolyte pH is increased. Therefore, the anolyte preferably has a pH greater than 11 and more preferably a pH from 12 to 14.

The water produced at the anode of cell 415 can be recovered and recycled to the catholyte compartment of cell 410.

The NaI produced in the catholyte compartment of cell 415 is the regenerated oxidizable substance and is introduced into the anolyte compartment of cell 410.

In one non-limiting embodiment, the catholyte compartment of cell 410 is operated at a pH of about 8 and maintained at this lower pH through use of a buffer, such as borax (sodium borate). The catholyte removed from cell 410 necessarily contains the sodium borate buffer in addition to the sodium hydroxide. As the sodium hydroxide is concentrated and the pH increases in the concentrator/dehydrator, the sodium borate precipitates and is recovered and recycled for further use in the catholyte compartment of cell 410.

Additional operational efficiency may be obtained by operating the anolyte compartment of cell 415 at a low temperature and at low current. Further operational efficiency may be obtained by operating the catholyte compartment of cell 410 at high temperature and high current.

The described systems and methods may have several beneficial characteristics. In one example, the described methods are able to produce hydrogen through a method that uses less electrical energy (lower voltage) than does the production of hydrogen through some traditional methods for producing hydrogen gas through the electrolysis of water. Accordingly, some embodiments of the described systems and methods may more efficient and/or less expensive than some conventional methods of water electrolysis.

In another example, because the described systems and methods include an alkali cation selective membrane, the described systems advantageously allow the cell 10 to keep the contents of the anolyte 15 and catholyte 30 compartments separate. In this manner, the described systems and methods can allow the cell to function while the anolyte 20 and the catholyte 35 comprise different materials.

In still another example, because the alkali metal salt can be regenerated by mixing the oxidized product from the anolyte compartment 15 with the alkali hydroxide produced in the catholyte compartment 30, in some embodiments, most, if not all of the alkali metal salt can be regenerated and be recycled through the cell 10 to produce more hydrogen. In this manner, the described systems and methods may be more efficient and less costly than they would otherwise be if the alkali metal salt could not be regenerated.

The following examples and experimental results are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLES

Figure 5:
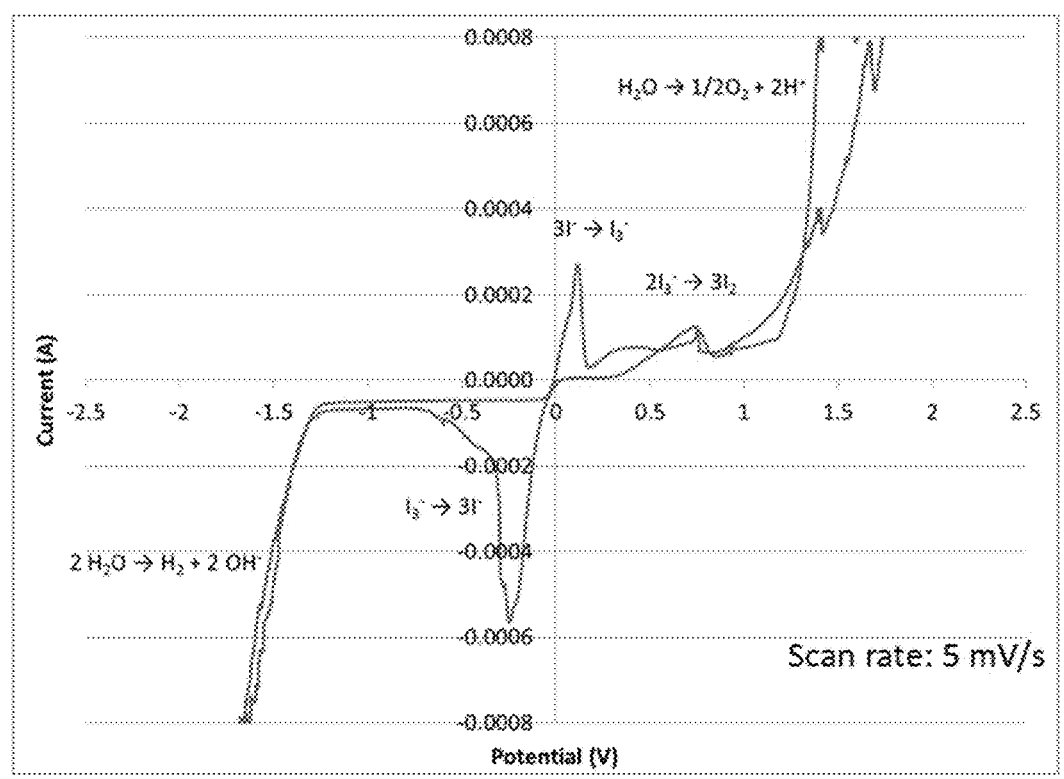
FIG. 5 depicts a graph showing test results that plots current against voltage for one embodiment of the cell at a scan rate of 5 mV/s.

Referring now to FIG. 5, one example shows how the described systems and methods may function. A standard electrochemical cyclic voltammetry (CV) method was used to study oxidation of near neutral pH sodium iodide solution. The test setup includes three platinum electrodes (one reference, one counter and one working) immersed in an aqueous solution of 0.2M NaI/0.1M $I_2$. The test was conducted at ambient temperature. During the test, the cell voltage is gradually increased and decreased versus the cell open circuit voltage and the working electrode potential is measured using the reference electrode. Also measured is the cell current generated by the reactions at the working and counter electrodes. FIG. 5 shows the different processes (represented by increased current) occurring during the working electrode potential scan versus the reference. During the positive anodic (oxidation) scan the first process to occur is the oxidation of iodide to triiodide according to reaction O:

$$3NaI \rightarrow NaI_3 + 2Na^+ + 2e^- \quad (O)$$

Next oxidation peak occurs due to oxidation of triiodide to molecular iodine (reaction P)

$$NaI_3 \rightarrow 3/2 I_2 + Na^+ + e^- \quad (P)$$

More positive scan has resulted in water splitting reaction to generate oxygen (reaction Q).

$$2H_2O \rightarrow O_2 + 4H^+ + 4e^- \quad (Q)$$

This data shows that it is easier to oxidize sodium iodide than water which is taken advantage in the present invention to couple the iodide oxidation reaction with the traditional aqueous alkaline hydrogen generation cathode to make a hydrogen generation cell that operates at significantly lower voltage than traditional water splitting cell. The solid Na ion conductive solid electrolyte membrane ensures separation of the anode and cathode processes.

In one example showing how the described systems and methods may function to generate hydrogen, the described cell 10 was used with an anolyte consisting of a 1:1 weight ratio of sodium iodide (NaI) to 20 μm graphite, with a small amount of glycerol to bind the mixture.

In the described example, the independent variables were temperature and current density. In particular, the cell 10 was operated at 65 degrees Celsius and 100 degrees Celsius as well as with a current density of 1 and 25 $mA/cm^2$ and the cell underwent 4 separate runs.

To provide a better understanding of the described experimental results, a brief description of the experimental setup is provided below.

The sodium iodide used was 99.9% NaI (metals basis). Furthermore, the glycerol used for mixing the sodium iodide with the graphite was a conventional 99% glycerol.

With respect to the catholyte, the catholyte used in all tests was a 15 wt % NaOH solution.

Turning now to the components of the cell 10, because a stainless steel mesh anode was found to provide a lower overall cell voltage than did platinum and titanium mesh anodes, a stainless steel mesh was used as the anode current collector 25 for the majority of tests. Along these lines, a nickel mesh was used as the cathode current collector 40 in all of the experiments. Furthermore, a NaSICON solid electrolyte membrane having an area and thickness of about 3.24 $cm^2$ and about 0.5 mm, respectively, was used as the membrane 45 to separate the anolyte 15 and the catholyte 30 compartments. Additionally, high-temperature-rated polytetrafluoroethylene (TEFLON®) tubing and tube fittings were used to pump the 15 wt % NaOH in and out of the cell.

With respect now to the cell's setup, the electrode current collectors 25 and 40 were each positioned approximately 1 mm from the membrane 45 (e.g., the thickness of a conventional gasket). The anode/anolyte paste was placed directly on an exposed part of the membrane 45, in the center of a gasket (not shown). The anode 25, in turn, was then placed over the anolyte paste and onto the gasket, followed by an additional layer of sodium iodide/graphite paste on the outside part of the anode 25. The membrane 45 and electrodes 25 and 40 were then sealed in a scaffold (not shown).

After the cell 10 was setup, the cell and cell solutions were allowed to heat up to the desired temperature (e.g., 65 or 100 degrees Celsius). At that point, the solutions were then allowed to circulate along with an applied voltage. A SOLARTRON® 1255B Frequency Response Analyzer with SI1287 Electrochemical Interface or a BK PRECISION® 1786B was used to provide the constant current to the cell.

Figure 6:
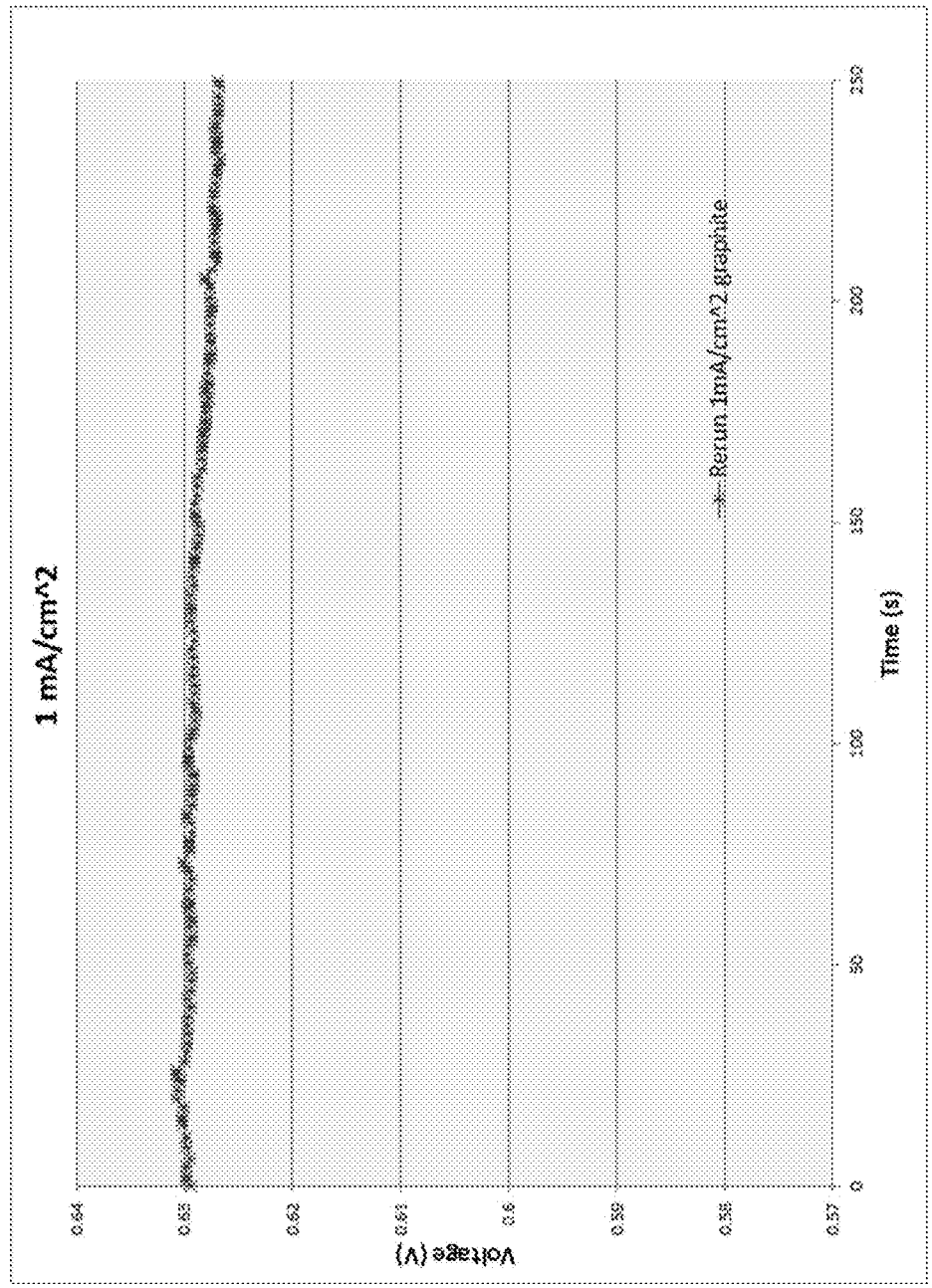
FIG. 6 depicts a graph showing test results that plots voltage against time for one embodiment of the cell wherein voltage is applied to the cell at about 1 mA/cm$^2$.
Figure 7:
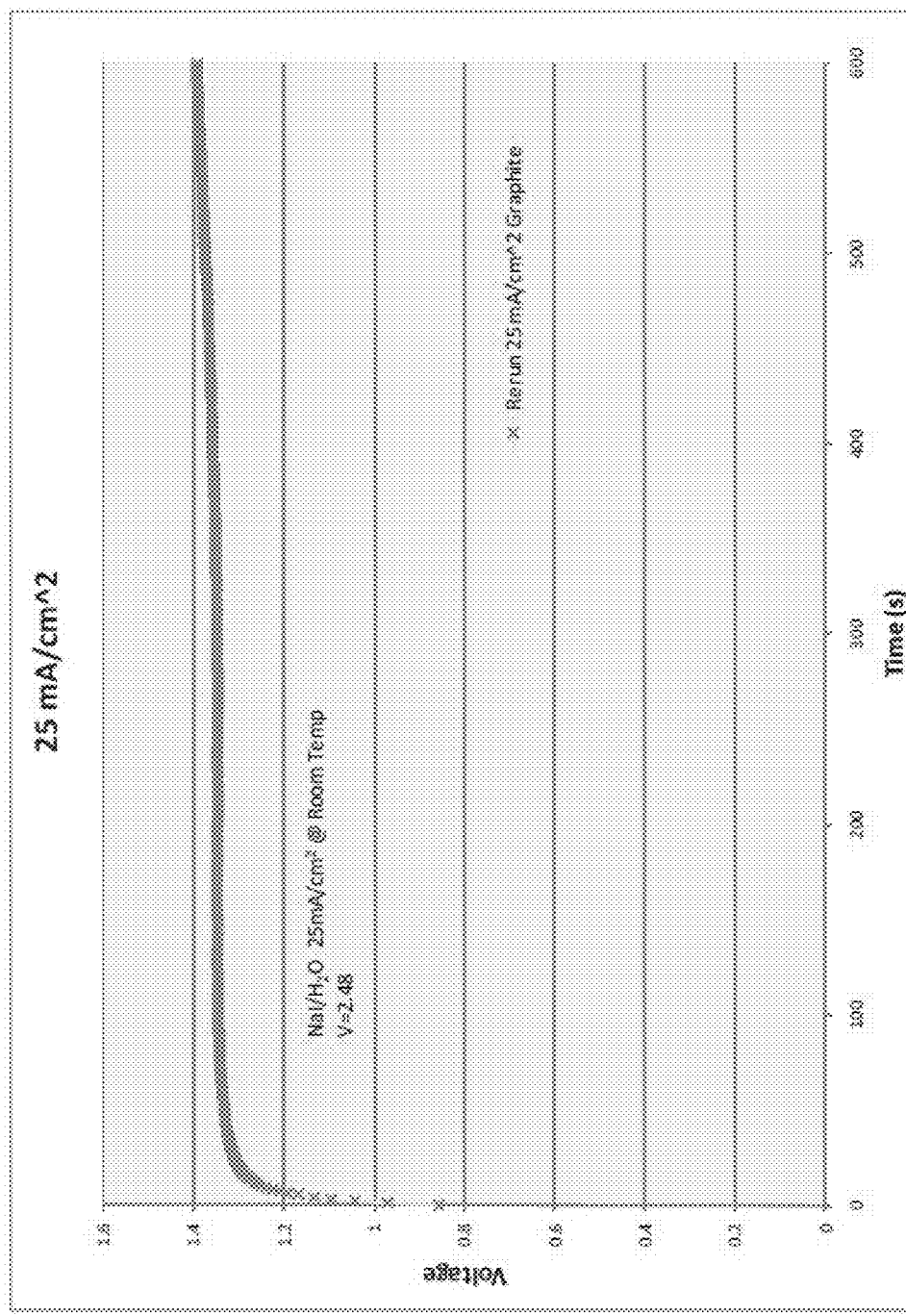
FIG. 7 depicts a graph showing test results that plots voltage against time for one embodiment of the cell wherein voltage is applied to the cell at about 25 mA/cm$^2$.

Turning now to the experimental results, FIGS. 6 and 7 show the voltage vs. time plots for the tests run at 1 and 25 mA per sq·cm. of membrane area, respectively.

As can be seen from FIGS. 6 and 7, in both cases (1 and 25 $mA/cm^2$) with a sodium iodide/graphite as the anolyte shows lower voltage than that of traditional electrolyzers. The data at 1 $mA/cm^2$ shows the cell voltage to be near 0.63 V which is well below the hydrogen evolution voltage of the traditional water electrolyzer (>1.23V). Based on the CV data presented above, the anode reaction corresponds to iodide to triiodide oxidation (reaction O) resulting in nearly 0.6V lower voltage than oxygen evolution reaction.

FIG. 7 shows the voltage behavior when a current density of 25 $mA/cm^2$ was applied to the cell at 65 degrees Celsius. The cell voltage increased from initial value of 0.86V to 1.4V during the span of the 10 min test. It is possible that the higher voltage is representative of reaction P. This preliminary result again confirms that it is possible to achieve lower voltages using sodium iodide/iodine reaction compared to oxygen evolution reaction by water splitting even at practical current densities.

Thus, from the described experiments, it has been shown that it is possible to reduce the voltage in producing hydrogen by using different oxidation reactions at the anode. Additionally, it has been shown that, in at least some embodiments, an increase in temperature may reduce the voltage. Furthermore, experiments show that, in at least in some embodiments, sodium iodide/graphite and sodium iodide in methanol are well suited for use as the anolyte. That said, sodium iodide/graphite has the potential to be used at higher temperatures than sodium iodide/methanol. Finally, the described experiments also showed that nickel and stainless steel cathodes and anodes, respectively, can help reduce the electrical potential needed to produce hydrogen in the cell.

While specific embodiments and examples of the present invention have been illustrated and described, numerous modifications come to mind without significantly departing from the spirit of the invention, and the scope of protection is only limited by the scope of the accompanying claims.

The invention claimed is:

1. A method for producing hydrogen, the method comprising:
   providing an electrochemical cell comprising:
      an anolyte compartment holding an anolyte, the anolyte compartment comprising
         an anode in contact with the anolyte, wherein
         at least one of the anode and the anolyte comprises an oxidizable substance,
         the standard oxidation potential for the oxidation of the oxidizable substance is higher than the standard oxidation potential for the oxidation of water,
         the anolyte comprises an alkali metal salt of the oxidizable substance, and
         the oxidizable substance is selected from the group consisting of a halide ion, a manganese oxide ion, and an aluminum oxide ion;
      a catholyte compartment holding a catholyte, the catholyte compartment comprising a cathode in contact with the catholyte, wherein the catholyte comprises a reducible substance that is electrochemically reduced to form hydrogen; and
      an alkali cation selective membrane that separates the anolyte compartment from the catholyte compartment;
   applying an electrical potential that is less than 1.8V between the anode and the cathode to oxidize the oxidizable substance to form an oxidized product and to reduce the reducible substance to form hydrogen and a reduced product, wherein the minimum applied voltage required for the production of hydrogen is less than the theoretical decomposition voltage of water;
   recovering the oxidized product from the catholyte compartment;
   recovering the reduced product from the anolyte compartment; and
   reacting the oxidized product and the reduced product to regenerate the oxidizable substance.

2. The method of claim 1, wherein the alkali cation conductive membrane is selected from a NaSICON membrane, a NaSICON-type membrane, a LiSICON membrane, a LiSICON-type membrane, a KSICON membrane, a KSICON-type membrane, a sodium conducting glass, a β or β″ alumina membrane, and a solid polymeric sodium ion conductive membrane.

3. The method of claim 1, wherein the halide ion is selected from iodine or bromine ion.

4. The method of claim 1, wherein the alkali metal salt comprise sodium iodide.

5. The method of claim 4, further comprising oxidizing the sodium iodide in the anolyte to form molecular iodine or sodium triiodide, and further comprising regenerating the sodium iodide by reacting the molecular iodine or sodium triiodide with sodium hydroxide.

6. The method of claim 1, further comprising adding a buffer to the catholyte in the catholyte compartment.

7. The method of claim 6, wherein the buffer is an alkali borate buffer.

8. The method of claim 1, wherein the anolyte comprises sodium iodide and an additive selected from a mixture of conductive material and solvent, wherein the conductive material is selected from graphite, titanium, tantalum, molybdenum while the solvent is selected from alcohols, glymes, ethers, ionic-liquids, or water.

9. The method of claim 1, wherein the catholyte comprises an organic or aqueous solution of sodium hydroxide, sodium carbonate, sodium halide, or halogen.

10. The method of claim 1, wherein the catholyte comprises a non-aqueous methanol/sodium methoxide solution.

11. The method of claim 1, further comprising heating the anolyte to between about 40 and about 140 degrees Celsius.

12. The method of claim 1, wherein the anolyte further comprises a material selected from a non-aqueous solvent and a solid-state conductive additive.

13. The method of claim 1, wherein the anode comprises a dimensionally stable anode and the anolyte comprises an aqueous solvent.

14. A method for producing hydrogen, the method comprising:
   providing an electrochemical cell comprising:
      an anolyte compartment holding an anolyte, the anolyte compartment comprising an anode in contact with the anolyte, wherein
         at least one of the anode and the anolyte comprises an oxidizable substance comprising a chalcogenide ion,
         the standard oxidation potential for the oxidation of the oxidizable substance is higher than the standard oxidation potential for the oxidation of water,
         the anolyte comprises a non-aqueous solvent and an alkali metal salt of the oxidizable substance;
      a catholyte compartment holding a catholyte, the catholyte compartment comprising a cathode in contact with the catholyte, wherein the catholyte comprises a reducible substance that is electrochemically reduced to form hydrogen; and
      an alkali cation selective membrane that separates the anolyte compartment from the catholyte compartment;
   applying an electrical potential that is less than 1.8V between the anode and the cathode to oxidize the oxidizable substance to form an oxidized product and to reduce the reducible substance to form hydrogen and a reduced product, wherein the minimum applied voltage required for the production of hydrogen is less than the theoretical decomposition voltage of water; and
   recovering the oxidized product from the catholyte compartment.

15. The method of claim 14, further comprising:
   recovering the oxidized product from the catholyte compartment;
   recovering the reduced product from the anolyte compartment; and
   reacting the oxidized product and the reduced product to regenerate the oxidizable sub stance.

16. A method for producing hydrogen, the method comprising:
providing an electrochemical cell comprising:
an anolyte compartment holding an anolyte, the anolyte compartment comprising
an anode in contact with the anolyte, wherein
at least one of the anode and the anolyte comprises an oxidizable substance,
the standard oxidation potential for the oxidation of the oxidizable substance is higher than the standard oxidation potential for the oxidation of water, and
the anolyte comprises sodium iodide;
a catholyte compartment holding a catholyte, the catholyte compartment comprising a cathode in contact with the catholyte, wherein the catholyte comprises an organic or aqueous solution of sodium hydroxide which is electrochemically reduced to form hydrogen; and
an alkali cation selective membrane that separates the anolyte compartment from the catholyte compartment;
applying an electrical potential that is less than 1.8V between the anode and the cathode to oxidize the sodium iodide in the anolyte to form molecular iodine or sodium triiodide and to reduce the sodium hydroxide to form hydrogen and hydroxyl ions, wherein the minimum applied voltage required for the production of hydrogen is less than the theoretical decomposition voltage of water;
recovering the oxidized product from the catholyte compartment; and
regenerating the sodium iodide by reacting the molecular iodine or sodium triiodide with the sodium hydroxide.

17. The method of claim 14, wherein the chalcogenide ion comprises sulfur ion, selenium ion or tellurium ion.

* * * * *

UNITED STATES PATENT AND TRADEMARK OFFICE
CERTIFICATE OF CORRECTION

| | | |
|---|---|---|
| PATENT NO. | : 10,337,108 B2 | Page 1 of 1 |
| APPLICATION NO. | : 15/061427 | |
| DATED | : July 2, 2019 | |
| INVENTOR(S) | : Ashok V. Joshi and Sai Bhavaraju | |

It is certified that error appears in the above-identified patent and that said Letters Patent is hereby corrected as shown below:

In the Claims

At Column 18, Lines 1 and 2, delete Claim 4 and insert the following:
--4. The method of claim 1, wherein the alkali metal salt comprises sodium iodide.--

Signed and Sealed this
Third Day of September, 2019

Andrei Iancu
*Director of the United States Patent and Trademark Office*